United States Patent
Young et al.

(10) Patent No.: US 11,704,547 B2
(45) Date of Patent: *Jul. 18, 2023

(54) TRANSPOSING NEURAL NETWORK MATRICES IN HARDWARE

(71) Applicant: Google LLC, Mountain View, CA (US)

(72) Inventors: Reginald Clifford Young, Palo Alto, CA (US); Geoffrey Irving, San Francisco, CA (US)

(73) Assignee: Google LLC, Mountain View, CA (US)

(*) Notice: Subject to any disclaimer, the term of this patent is extended or adjusted under 35 U.S.C. 154(b) by 137 days.

This patent is subject to a terminal disclaimer.

(21) Appl. No.: 17/162,745

(22) Filed: Jan. 29, 2021

(65) Prior Publication Data

US 2021/0224641 A1 Jul. 22, 2021

Related U.S. Application Data

(63) Continuation of application No. 15/455,024, filed on Mar. 9, 2017, now Pat. No. 10,909,447.

(51) Int. Cl.
*G06N 3/063* (2023.01)
*G06F 7/78* (2006.01)
(Continued)

(52) U.S. Cl.
CPC ............... *G06N 3/063* (2013.01); *G06F 7/78* (2013.01); *G06F 17/16* (2013.01); *G06N 3/04* (2013.01);
(Continued)

(58) Field of Classification Search
CPC ...... G06N 3/063; G06N 3/0454; G06N 3/084; G06N 3/04; G06F 7/78; G06F 17/16; G06F 2207/4824
(Continued)

(56) References Cited

U.S. PATENT DOCUMENTS 5,073,752 A * 12/1991 DeMeester ............ G01R 33/56
324/309
5,644,517 A * 7/1997 Ho ............................ G06F 7/78
708/401
(Continued)

FOREIGN PATENT DOCUMENTS

CN 102437858 5/2012
CN 105068546 A 11/2015
(Continued)

OTHER PUBLICATIONS

Hwang et al., "A Systolic Neural Network Architecture for Hidden Markov Models", IEEE Transactions on Acoustic, Speech, and Signal Processing, vol. 37, No. 12, Dec. 1989 (Year: 1989).*
(Continued)

*Primary Examiner* — Tsu-Chang Lee
(74) *Attorney, Agent, or Firm* — Fish & Richardson P.C.

(57) ABSTRACT

Methods, systems, and apparatus, including computer programs encoded on a computer storage medium. In one aspect, a method includes the actions of receiving a request to perform computations for a neural network on a hardware circuit having a matrix computation unit, the request specifying a transpose operation to be performed on a first neural network matrix; and generating instructions that when executed by the hardware circuit cause the hardware circuit to transpose the first neural network matrix by performing first operations, wherein the first operations include repeatedly performing the following second operations: for a current subdivision of the first neural network matrix that divides the first neural network matrix into one or more current submatrices, updating the first neural network matrix by swapping an upper right quadrant and a lower left quadrant of each current submatrix, and subdividing each
(Continued)

current submatrix into respective new submatrices to update the current subdivision.

13 Claims, 9 Drawing Sheets

(51) Int. Cl.
  *G06F 17/16* (2006.01)
  *G06N 3/04* (2023.01)
  *G06N 3/084* (2023.01)
  *G06N 3/045* (2023.01)
(52) U.S. Cl.
  CPC ...... *G06F 2207/4824* (2013.01); *G06N 3/045* (2023.01); *G06N 3/084* (2013.01)
(58) Field of Classification Search
  USPC .......................................................... 706/16
  See application file for complete search history.

(56) References Cited

U.S. PATENT DOCUMENTS

| | | | |
|---|---|---|---|
| 6,877,020 | B1 | 4/2005 | Bratt et al. |
| 7,395,251 | B2 | 7/2008 | Linsker |
| 2002/0146160 | A1 | 10/2002 | Parker |
| 2006/0115029 | A1 | 6/2006 | Marrow |
| 2006/0190517 | A1* | 8/2006 | Guerrero .............. G06F 7/762 708/514 |
| 2008/0292197 | A1 | 11/2008 | Nakagawa |
| 2012/0065956 | A1 | 3/2012 | Irturk |
| 2016/0342889 | A1 | 11/2016 | Thorson et al. |
| 2016/0342890 | A1 | 11/2016 | Young et al. |
| 2016/0342891 | A1 | 11/2016 | Ross et al. |
| 2016/0342892 | A1 | 11/2016 | Ross |
| 2016/0342893 | A1 | 11/2016 | Ross et al. |
| 2017/0091620 | A1* | 3/2017 | Gokmen .............. G06N 3/04 |
| 2017/0103313 | A1 | 4/2017 | Ross et al. |
| 2017/0103314 | A1 | 4/2017 | Ross |
| 2017/0103315 | A1 | 4/2017 | Thorson et al. |
| 2017/0103316 | A1 | 4/2017 | Ross et al. |
| 2017/0103317 | A1 | 4/2017 | Young et al. |
| 2017/0103318 | A1 | 4/2017 | Ross et al. |

FOREIGN PATENT DOCUMENTS

| | | |
|---|---|---|
| CN | 105913117 | 8/2016 |
| CN | 106021188 | 10/2016 |
| CN | 106022468 | 10/2016 |
| TW | 201640422 A | 11/2016 |

OTHER PUBLICATIONS

Lezar et al, "GPU Acceleration of Matrix-based Methods in Computational Electromagnetics", Ph.D dissertation, Department of Electrical and Electronic Engineering, Stellenbosch University, South Africa, 2011 (Year: 2011).*
TW Office Action in Taiwan Application No. 108127280, dated Jul. 5, 2021, 15 pages (with English translation).
CN Office Action in Chinese Application No. 201810196453.4, dated Jun. 10, 2021, 21 pages (with English translation).
'devblogs.nvidia.com' [online] "An Efficient Matrix Transpose in CUDA C/C++," Feb. 18, 2013 [retrieved on Mar. 9, 2017] Retrieved from Internet URL<.
'www.netlib.org' [online] "Algorithms for in-place matrix transposition," Sep. 5, 2014, [retrieved on Mar. 9, 2017] Retrieved from Internet URL<http://www.netlib.org/utk/people/JackDongarra/CCDSC-2014/talk35.pdf> 29 pages.
'www.stackoverflow.com' [online] "Matrix multiplication using transpose in C," Last Updated on Dec. 20, 2014, [retrieved on Mar. 9, 2017] Retrieved from Internet URL<http://stackoverflow.com/questions/12795143/matrix-multiplication-using-transpose-in-c> 3 pages.
Catanzaro et al. "A Decomposition for In-place Matric Transposition," ACM SIGPLAN Notices 49.8, Nov. 26, 2014, 14 pages.
Chatteijee et al. "Cache-Efficient Matrix Transposition," Sixth International Symposium on High-Performance Computer Architecture, 2000, 13 pages.
Dietzfelbinger et al "The complexity of matrix transposition on one-tape off-line Turing machines," Theoretical Computer Science, vol. 82.1, May 22, 1991, 17 pages.
Dunnoulin, et al., "A guide to convolution arithmetic for deep learning", arXiv:1603.07285v1, Mar. 23, 2016.
Extended European Search Report issued in European Application No. 18160942.1, dated Jul. 11, 2018, 10 pages.
Great Britain Office Action in Great Britain Application No. GB1803 806.7, dated Mar. 4, 2020, 6 pages.
Hwang, et al., "A Systolic Neural Network Architecture for Hidden Markov Models", IEEE Transactions on Acoustic, Speech, and Signal Processing, vol. 37, No. 12, dated Dec. 1989.
International Search Report and Written Opinion issued in International Application No. PCT/US2018/021681, dated Jun. 20, 2018, 16 pages.
Klint. "Matrix representation of a Neural Network," Jan. 1, 2003, [retrieved on Jun. 12, 2018] Retrieved from Internet: URLhttp://orbit.dtu.dk/en/publications/matrix-representation-of-a-neural-netowrk(f161d82e-d35b-4eec-b978-5074cf0e9289).html> 8 pages.
O'Leary. "Systolic Arrays for Matrix Transpose and Other Reorderings," IEEE Transactions on Computers, vol. C-36, No. 1 Jan. 1, 1987, 6 pages.
PCT International Preliminary Report on Patentability issued in International Application No. PCT/US2018/021681, dated Sep. 10, 2019, 9 pages.
TW Office Action issued in Taiwanese Application No. 107108167, dated Jan. 11, 2019, 10 pages (English translation).
Wolfram MathWorld, Permutation Matrixby EW Weisstein, 2002.
Zhang, "Dense Matrix algorithms" in "parallel and distributed computation" Matric transposition on hypercube, 2012.
Office Action in German Appln. No. 10 2018 105 457.2, dated Feb. 1, 2023, 18 pages (with English Translation).

* cited by examiner (a)

| Input[0] | A | B | C | D |
| Input[1] | E | F | G | H |
| Input[2] | I | J | K | L |
| Input[3] | M | N | O | P |

(b)

W1:
| 1 | 0 | 0 | 0 |
| 0 | 1 | 0 | 0 |
| 0 | 0 | 0 | 0 |
| 0 | 0 | 0 | 0 |

W2:
| 0 | 0 | 0 | 0 |
| 0 | 0 | 0 | 0 |
| 1 | 0 | 0 | 0 |
| 0 | 1 | 0 | 0 |

W3:
| 0 | 0 | 0 | 0 |
| 0 | 0 | 0 | 0 |
| 0 | 0 | 1 | 0 |
| 0 | 0 | 0 | 1 |

W4:
| 0 | 0 | 1 | 0 |
| 0 | 0 | 0 | 1 |
| 0 | 0 | 0 | 0 |
| 0 | 0 | 0 | 0 |

(c)

(1) (Input[0] * W1) + (Input[2] * W4) = [AB00] + [00IJ] = [ABIJ]

(2) (Input[1] * W1) + (Input[3] * W4) = [EF00] + [00MN] = [EFMN]

(3) (Input[0] * W2) + (Input[2] * W3) = [CD00] + [00KL] = [CDKL]

(4) (Input[1] * W2) + (Input[3] * W3) = [GH00] + [00OP] = [GHOP]

(d)

| A | B | I | J |
| E | F | M | N |
| C | D | K | L |
| G | H | O | P |

(e)

| Input[4] | A | B | I | J |
| Input[5] | E | F | M | N |
| Input[6] | C | D | K | L |
| Input[7] | G | H | O | P |

(f)

W5:
| 1 | 0 | 0 | 0 |
| 0 | 0 | 0 | 0 |
| 0 | 0 | 1 | 0 |
| 0 | 0 | 0 | 0 |

W6:
| 0 | 1 | 0 | 0 |
| 0 | 0 | 0 | 0 |
| 0 | 0 | 0 | 1 |
| 0 | 0 | 0 | 0 |

W7:
| 0 | 0 | 0 | 0 |
| 1 | 0 | 0 | 0 |
| 0 | 0 | 0 | 0 |
| 0 | 0 | 1 | 0 |

W8:
| 0 | 0 | 0 | 0 |
| 0 | 1 | 0 | 0 |
| 0 | 0 | 0 | 0 |
| 0 | 0 | 0 | 1 |

(g)

(1) (Input[4] * W5) + (Input[5] * W6) = AEIM
(2) (Input[4] * W7) + (Input[5] * W8) = BFJN
(3) (Input[6] * W5) + (Input[7] * W6) = CGKO
(4) (Input[6] * W7) + (Input[7] * W8) = DHLP (h)

| A | E | I | M |
| B | F | J | N |
| C | G | K | O |
| D | H | L | P |

FIG. 9

TRANSPOSING NEURAL NETWORK MATRICES IN HARDWARE

CROSS REFERENCE TO RELATED APPLICATION

This application is a continuation of U.S. application Ser. No. 15/455,024, filed Mar. 9, 2017, the contents of which are incorporated by reference herein.

BACKGROUND

This specification relates to transposing neural network matrices in hardware.

Neural networks are machine learning models that employ one or more layers to generate an output, e.g., a classification, for a received input. Some neural networks include one or more hidden layers in addition to an output layer. The output of each hidden layer is used as input to another layer in the network, e.g., the next hidden layer or the output layer of the network. Each layer of the network generates an output from a received input in accordance with current values of a respective set of parameters.

SUMMARY

In general, this specification describes a special-purpose hardware circuit that computes neural network inferences.

One innovative aspect of the subject matter described in this specification can be embodied in methods that include the actions of receiving a request to perform computations for a neural network on a hardware circuit having a matrix computation unit, the request specifying a transpose operation to be performed on a first neural network matrix associated with the neural network; and generating instructions that when executed by the hardware circuit cause the hardware circuit to transpose the first neural network matrix by performing first operations, wherein the first operations include repeatedly performing the following second operations: for a current subdivision of the first neural network matrix that divides the first neural network matrix into one or more current submatrices, updating the first neural network matrix by swapping an upper right quadrant and a lower left quadrant of each current submatrix in the current subdivision using the matrix computation unit, and subdividing each current submatrix in the current subdivision into a respective plurality of new submatrices to update the current subdivision, each of the respective plurality of new submatrices being a respective quadrant of the current submatrix.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The embodiments of this aspect may include one or more of the following optional features. In some implementations, the first operations include determining that the first neural network matrix is not a ixi matrix, where i is a vector length value for the hardware circuit; in response, updating the first neural network matrix to generate a ixi matrix by zero-padding the first neural network matrix prior to performing all iterations of the second operations; and after performing all iterations of the second operations, converting the first neural network matrix to its condition before the update by removing the zeros padded during the update. In some implementations, the first operations further include obtaining data indicating that one or more values of the first neural network matrix are zero values; and updating the first neural network matrix includes preventing the matrix computation unit from performing any operation on a set of values including at least one of the one or more values of the first neural network matrix that are zero values. In some implementations, swapping the upper right quadrant of the current submatrix and the lower left quadrant of each current submatrix includes: multiplying each row of the first neural network matrix by one or more partial identity matrices to generate one or more vectors that each include a portion of the respective row with the elements of the upper right quadrant and the lower left quadrant of each respective current submatrix swapped; for each row of the first neural network matrix, combining the vectors corresponding to a portion of each respective row of the first neural network matrix with the elements of the upper right quadrant and the lower left quadrant of each respective current submatrix swapped; and generating the updated first neural network matrix by combining each respective row. In some implementations, the matrix computation unit performs a matrix multiplication operation as a series of vector multiplication operations. In some implementations, the second operations further include generating an initial current subdivision of the first neural network matrix, wherein the initial current subdivision contains an initial submatrix that is the first neural network matrix. In some implementations, the first operations further include transmitting the instructions to the hardware circuit.

Particular embodiments of the subject matter described in this specification can be implemented so as to realize one or more of the following advantages. A transpose operation on a matrix can be performed in hardware by a special-purpose hardware circuit, even where the hardware circuit cannot directly perform a matrix transpose operation. By performing the transpose operation using the special-purpose hardware circuit, the processing of a neural network operation or other operation specifying a transpose operation can be performed without passing data back to a host computer, i.e., without performing at least a part of the computation off-chip, even though the special-purpose hardware circuit does not directly support such processing. This allows for performing a transpose operation on a matrix without modifying the hardware architecture of the special-purpose hardware circuit. That is, processing delays resulting from performing part of the processing off-chip, in software, or both, are avoided.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 is an example of a computation for performing a transpose operation on a neural network matrix.

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. Each layer receives an input and processes the input in accordance with the set of weights for the layer to generate an output.

Therefore, in order to compute an inference from a received input, the neural network receives the input and processes it through each of the neural network layers to generate the inference, with the output from one neural network layer being provided as input to the next neural network layer. Data inputs to a neural network layer, e.g., either the input to the neural network or the outputs of the layer below the layer in the sequence, to a neural network layer can be referred to as activation inputs to the layer.

In some implementations, the layers of the neural network are arranged in a sequence. In some other implementations, the layers are arranged as directed graph. That is, any particular layer can receive multiple inputs, multiple outputs, or both. The layers of the neural network can also be arranged such that an output of a layer can be sent back as an input to a previous layer.

Figure 1:
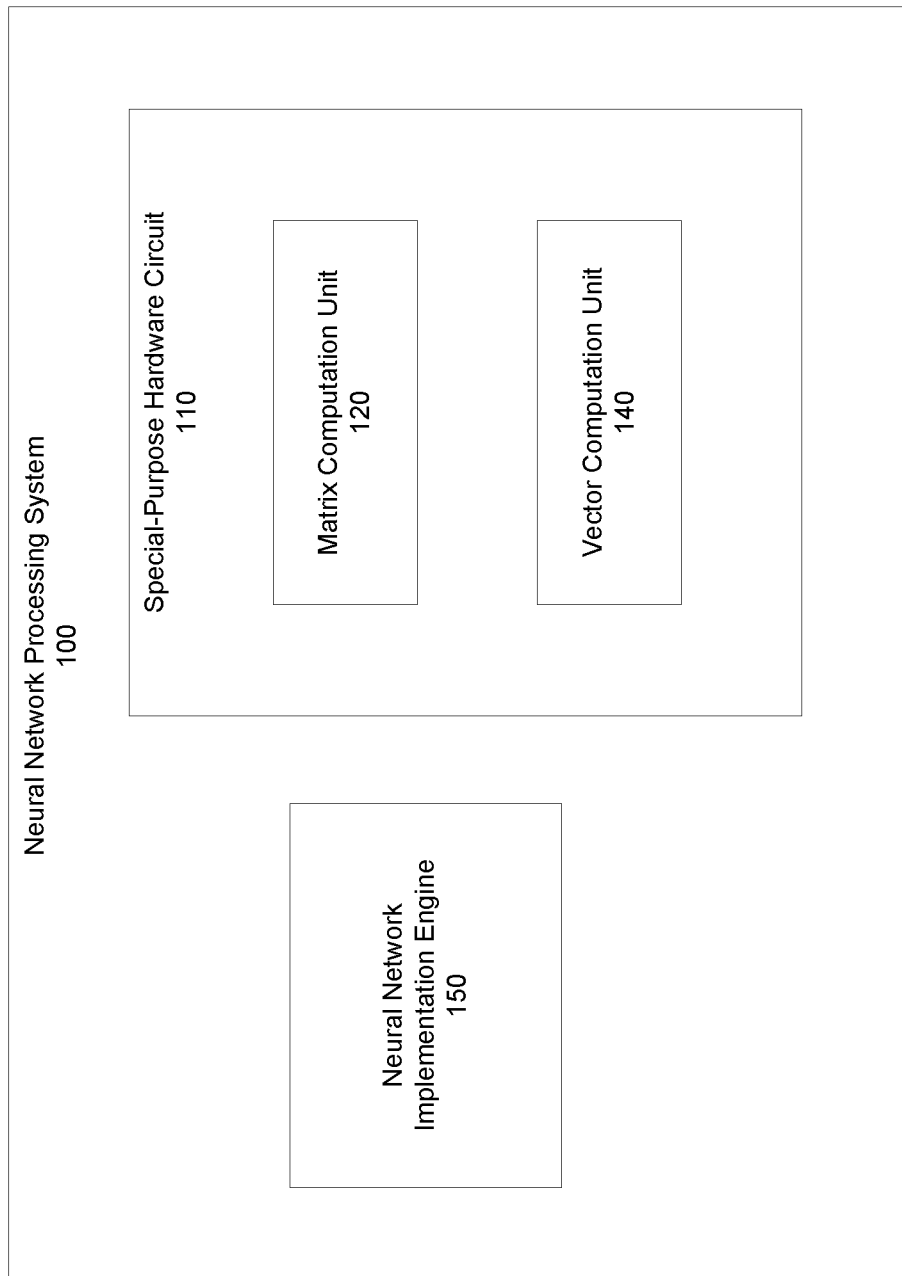
FIG. 1 shows an example neural network processing system.

FIG. 1 shows an example neural network processing system 100. The neural network processing system 100 is an example of a system implemented as one or more computers in one or more locations in which the systems, components, and techniques described below can be implemented.

The neural network processing system 100 is a system that performs neural network computations using a special-purpose hardware circuit 110. The hardware circuit 110 is an integrated circuit for performing neural network computations and includes a matrix computation unit 120 that performs vector-matrix multiplications in hardware. An example special-purpose hardware circuit 120 is described in more detail below with reference to FIG. 3.

In particular, the neural network processing system 100 receives requests to implement neural networks on the special-purpose hardware circuit 110, implements the neural networks on the special-purpose hardware circuit 110, and, once a given neural network is implemented, processes inputs to the neural network using the special-purpose integrated circuit 110 to generate neural network inferences.

That is, the neural network processing system 100 can receive a request that specifies a neural network architecture for a neural network that is to be used to process inputs. The neural network architecture defines the number and configuration of layers in the neural network and values of the parameters for each of the layers that has parameters.

To implement a neural network on the special-purpose integrated circuit 110, the neural network processing system 100 includes a neural network implementation engine 150 that is implemented as one or more computer programs on one or more computers in one or more physical locations.

The neural network implementation engine 150 generates instructions that, when executed by the special-purpose hardware circuit 110, cause the hardware circuit 110 to perform the operations specified by the neural network to generate a neural network output from a received neural network input.

Once the instructions have been generated by the neural network implementation engine 150 and provided to the hardware circuit 110, the neural network processing system 100 can receive neural network inputs and can process the neural network inputs using the neural network by causing the hardware circuit 110 to execute the generated instructions. Some neural networks specify a transpose operation on a neural network matrix, e.g., a neural network matrix including the weight values for a layer of the neural network. For instance, some neural networks may specify a transpose operation on matrices that are denser (i.e., have more meaningful values) in their first columns than they are in subsequent columns to expedite processing of the meaningful values of such matrices. Some neural network training algorithms may require transposing neural network matrices (e.g., during backpropagation). Some neural networks may require transpose of matrices as part of a transition from convolutional layers to fully-connected layers, or vice versa.

The main hardware unit that performs matrix operations on the hardware circuit 110 is the matrix computation unit 120, which cannot directly perform matrix transpose operations. Because of that, the integrated circuit cannot directly perform a transpose operation on a matrix. To implement a neural network that specifies a transpose operation on a matrix, the neural network implementation engine 150 generates instructions that, when executed by the special-purpose hardware circuit 110 during processing of a neural network input by the neural network, cause the hardware circuit 110 to perform a matrix transpose operation on a matrix using the matrix multiplication unit 120 and the vector computation unit 140. These instructions and other operations are described in more detail below with reference to FIGS. 6-9.

Figure 2:
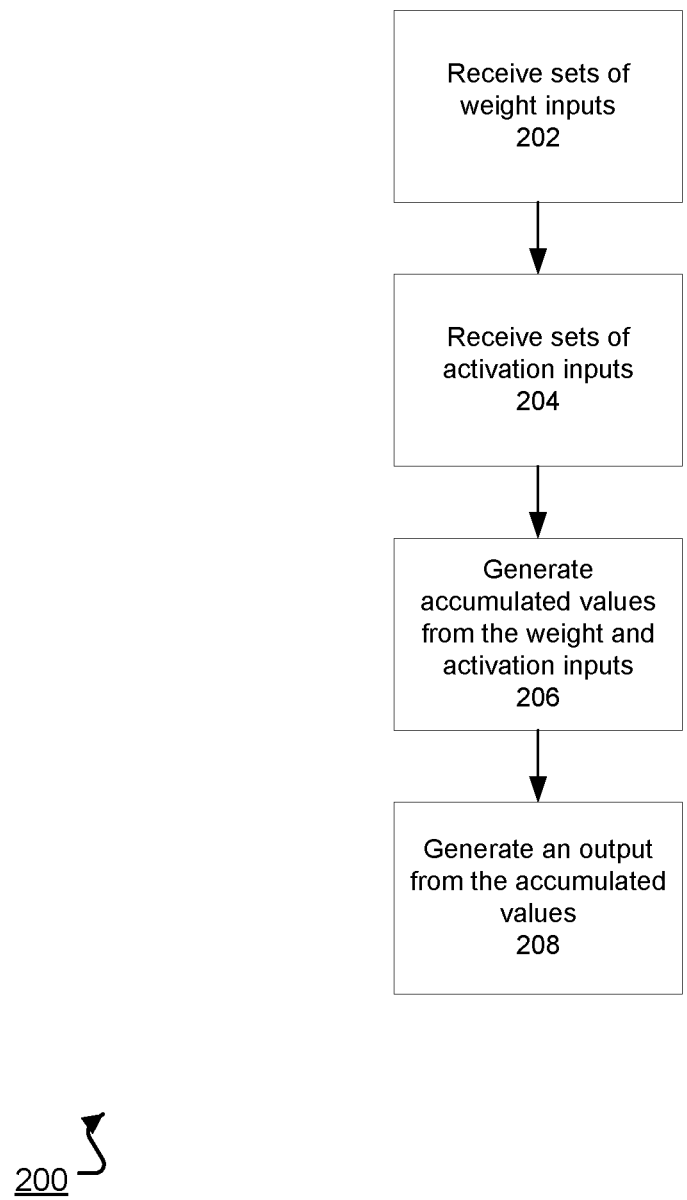
FIG. 2 is a flow diagram of an example method for performing a computation for a given layer of a neural network.

FIG. 2 is a flow diagram of an example process 200 for performing a computation for a given layer of a neural network using a special-purpose hardware circuit. For convenience, the method 200 will be described with respect to a system having one or more circuits that performs the method 200. The method 200 can be performed for each layer of the neural network in order to compute an inference from a received input.

The system receives sets of weight inputs (step 202) and sets of activation inputs (step 204) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 206). In some implementations, the accumulated values are dot products of the sets of weight inputs and the sets of activation inputs. That is, for one set of weights, which is a subset of all weights in the layer, the system can multiply each weight input with each activation input and sum the products together to form an accumulated value. The system can then compute dot products of other set of weights with other sets of activation inputs.

The system can generate a layer output from the accumulation values (step 208) using a vector computation unit of the special-purpose hardware circuit. In some implementations, the vector computation unit applies an activation function to the accumulated values, which will be described further below in reference to FIG. 5. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 3:
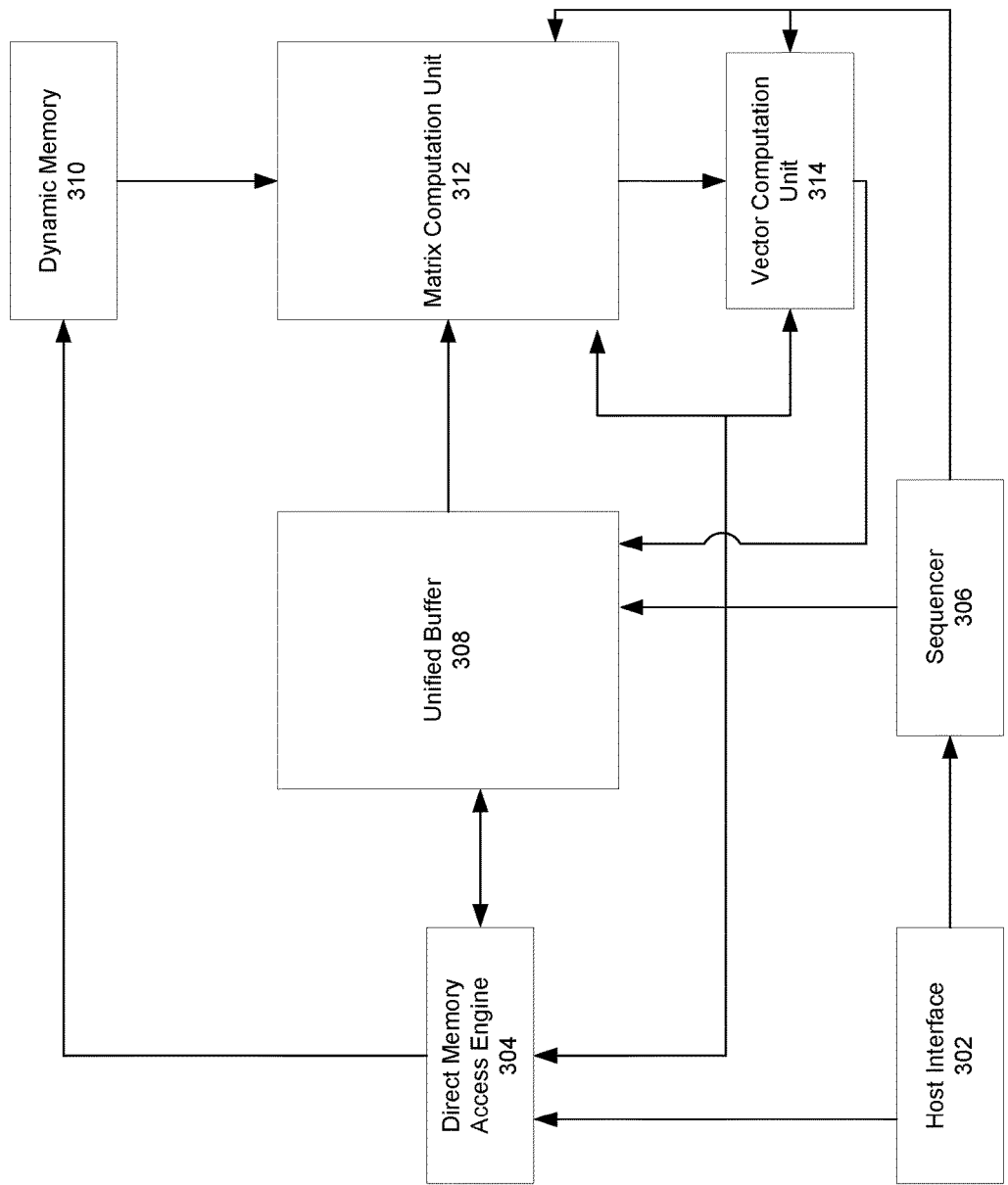
FIG. 3 shows an example neural network processing system.

FIG. 3 shows an example special-purpose hardware circuit 300 for performing neural network computations. The system 300 includes a host interface 302. The host interface 302 can receive instructions that include parameters for a neural network computation. The parameters can include one or more of the following: how many layers should be processed, corresponding sets of weight inputs for each layer of the model, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 302 can send the instructions to a sequencer 306, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 306 can send the control signals to a unified buffer 308, a matrix computation unit 312, and a vector computation unit 314. In some implementations, the sequencer 306 also sends control signals to a direct memory access engine 304 and dynamic memory 310. In some implementations, the sequencer 306 is a processor that generates control signals. The sequencer 306 can use timing of the control signals to, at appropriate times, send the control signals to each component of the circuit 300. In some other implementations, the host interface 302 passes in a control signal from an external processor.

The host interface 302 can send the sets of weight inputs and the initial set of activation inputs to the direct memory access engine 304. The direct memory access engine 304 can store the sets of activation inputs at the unified buffer 308. In some implementations, the direct memory access stores the sets of weights to dynamic memory 310, which can be a memory unit. In some implementations, the dynamic memory 310 is located off of the circuit.

The unified buffer 308 is a memory buffer. It can be used to store the set of activation inputs from the direct memory access engine 304 and outputs of the vector computation unit 314. The vector computation unit 314 will be described in more detail below with reference to FIG. 6. The direct memory access engine 304 can also read the outputs of the vector computation unit 314 from the unified buffer 308.

The dynamic memory 310 and the unified buffer 308 can send the sets of weight inputs and the sets of activation inputs, respectively, to the matrix computation unit 312. In some implementations, the matrix computation unit 312 is a two-dimensional systolic array. The matrix computation unit 312 can also be a one-dimensional systolic array or other circuitry that can perform mathematical operations, e.g., multiplication and addition. In some implementations, the matrix computation unit 312 is a general purpose matrix processor. The special-purpose hardware circuit 300 can use matrix computation unit 312 to perform a matrix transpose operation. Performing a matrix transpose operation using matrix computation unit 312 is described in greater detail below with reference to FIGS. 8-10.

The matrix computation unit 312 can process the weight inputs and the activation inputs and provide a vector of outputs to the vector computation unit 314. In some implementations, the matrix computation unit 312 sends the vector of outputs to the unified buffer 308, which sends the vector of outputs to the vector computation unit 314. The vector computation unit 314 can process the vector of outputs and store a vector of processed outputs to the unified buffer 308. The vector of processed outputs can be used as activation inputs to the matrix computation unit 312, e.g., for use in a subsequent layer in the neural network. The matrix computation unit 312 and the vector computation unit 314 will be described in more detail below with reference to FIG. 4 and FIG. 6, respectively.

Figure 4:
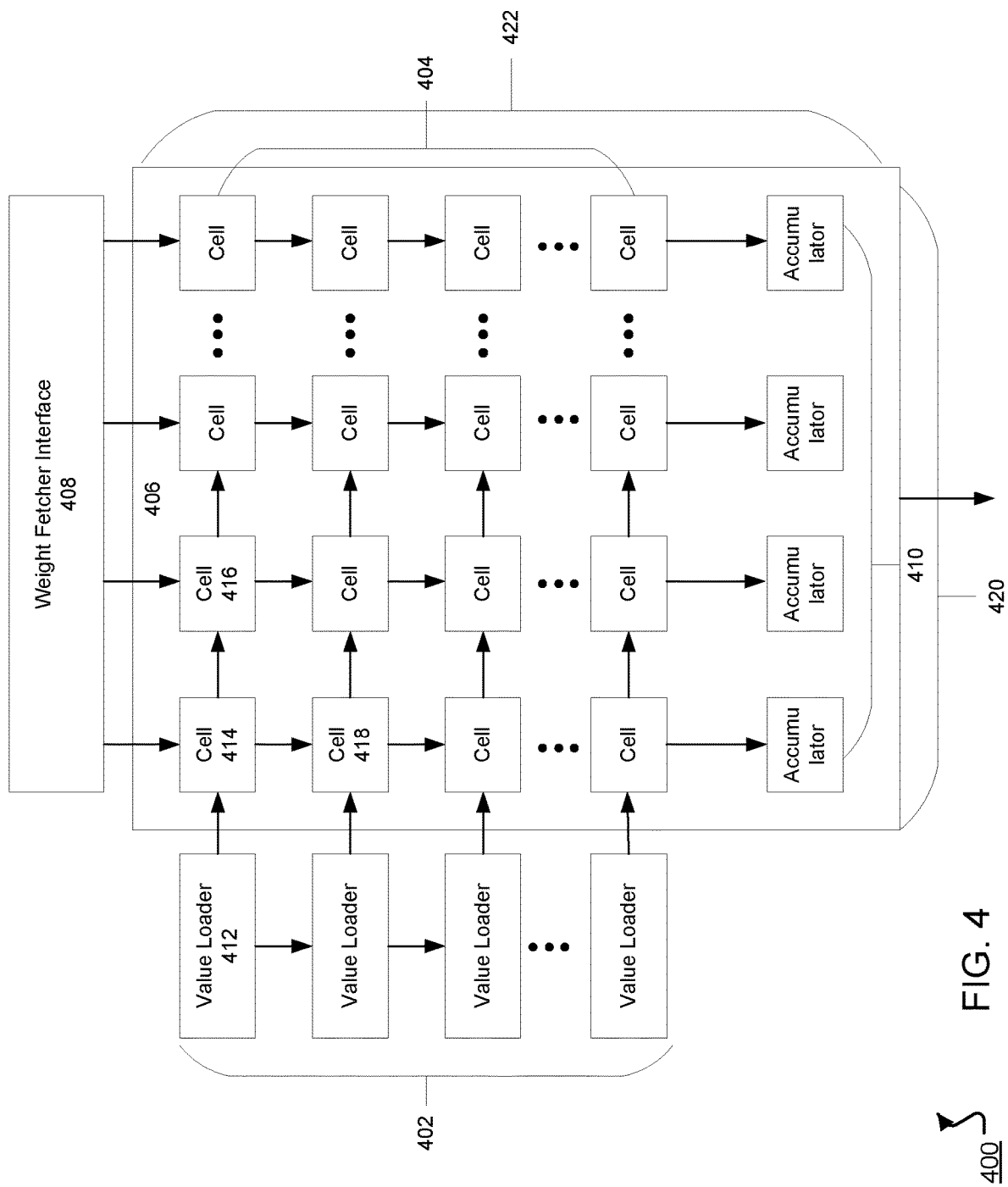
FIG. 4 shows an example architecture including a matrix computation unit.

FIG. 4 shows an example architecture 400 including a matrix computation unit. The matrix computation unit is a two-dimensional systolic array 406. The array 406 includes multiple cells 404. In some implementations, a first dimension 420 of the systolic array 406 corresponds to columns of cells and a second dimension 422 of the systolic array 406 corresponds to rows of cells. The systolic array can have more rows than columns, more columns than rows, or an equal number of columns and rows.

In the illustrated example, value loaders 402 send activation inputs to rows of the array 406 and a weight fetcher interface 408 sends weight inputs to columns of the array 406. In some other implementations, however, activation inputs are transferred to the columns and weight inputs are transferred to the rows of the array 406.

The value loaders 402 can receive the activation inputs from a unified buffer, e.g., the unified buffer 308 of FIG. 3. Each value loader can send a corresponding activation input to a distinct left-most cell of the array 406. For example, value loader 412 can send an activation input to cell 414.

The weight fetcher interface 408 can receive the weight input from a memory unit, e.g., the dynamic memory 310 of FIG. 3. The weight fetcher interface 408 can send a corresponding weight input to a distinct top-most cell of the array 406. For example, the weight fetcher interface 408 can send weight inputs to cells 414 and 416. The weight fetcher interface 408 is further capable of receiving multiple weights from the memory unit, e.g., the dynamic memory 310, and of sending the multiple weights to distinct top-most cells of the array 406 in parallel. For example, the weight fetcher interface 408 may send different weights to the cells 414 and 416 simultaneously.

In some implementations, a host interface, e.g., the host interface 302 of FIG. 3, shifts activation inputs throughout the array 406 along one dimension, e.g., to the right, while shifting weight inputs throughout the array 406 along another dimension, e.g., to the bottom. For example, over one clock cycle, the activation input at cell 414 can shift to an activation register in cell 416, which is to the right of cell 414. Similarly, the weight input at cell 416 can shift to a weight register at cell 418, which is below cell 414.

On each clock cycle, each cell can process a given weight input, a given activation input, and an accumulated output from an adjacent cell to generate an accumulated output. The accumulated output can also be passed to the adjacent cell along the same dimension as the given weight input. Each cell may also process a given weight input and a given activation input to generate an output, without processing an accumulated output from an adjacent cell. The output can be passed to adjacent cells along the same dimensions as the given weight input and output without being accumulated. An individual cell is described further below with reference FIG. 5.

The accumulated output can be passed along the same column as the weight input, e.g., towards the bottom of the column in the array 406. In some implementations, at the bottom of each column, the array 406 can include accumulator units 410 that store and accumulate each accumulated output from each column when performing calculations with layers having more activation inputs than rows. In some implementations, each accumulator unit stores multiple parallel accumulations. The accumulator units 410 can accumulate each accumulated output to generate a final accumulated value. The final accumulated value can be transferred to a vector computation unit, e.g., the vector computation unit of FIG. 6. In some other implementations, the accumulator units 410 passes the accumulated values to the vector computation unit without performing any accumulations when processing layers with layers having fewer activating inputs than rows.

Figure 5:
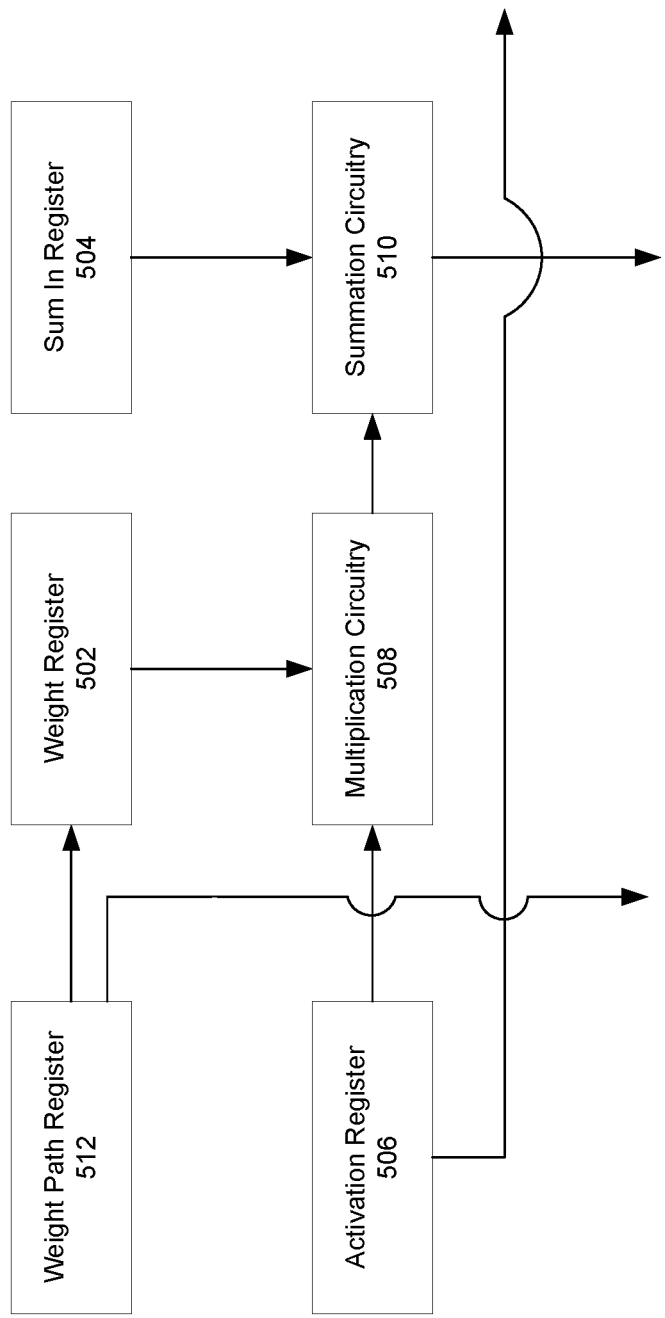
FIG. 5 shows an example architecture of a cell inside a systolic array.

FIG. 5 shows an example architecture 700 of a cell inside a systolic array, e.g., the systolic array 406 of FIG. 4.

The cell can include an activation register 506 that stores an activation input. The activation register can receive the activation input from a left adjacent cell, i.e., an adjacent cell located to the left of the given cell, or from a unified buffer, depending on the position of the cell within the systolic array. The cell can include a weight register 502 that stores a weight input. The weight input can be transferred from a top adjacent cell or from a weight fetcher interface, depending on the position of the cell within the systolic array. The cell can also include a sum in register 504. The sum in register 504 can store an accumulated value from the top adjacent cell. Multiplication circuitry 508 can be used to multiply the weight input from the weight register 502 with the activation input from the activation register 506. The multiplication circuitry 508 can output the product to summation circuitry 510.

The summation circuitry 510 can sum the product and the accumulated value from the sum in register 504 to generate a new accumulated value. The summation circuitry 510 can then send the new accumulated value to another sum in register located in a bottom adjacent cell. The new accumulated value can be used as an operand for a summation in the bottom adjacent cell. The summation circuitry 510 can also accept a value from the sum in register 504 and send the value from the sum in register 504 to a bottom adjacent cell without summing the value from the sum in register 504 with the product from the multiplication circuitry 508.

The cell can also shift the weight input and the activation input to adjacent cells for processing. For example, the weight path register 512 can send the weight input to another weight register in the bottom adjacent cell. The activation register 506 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 508, or can determine whether the multiplication circuitry 508 operates on the activation and weight inputs. The control signal can also be passed to one or more adjacent cells, e.g., using a wire.

In some implementations, weights are pre-shifted into a weight path register 512. The weight path register 512 can receive the weight input, e.g., from a top adjacent cell, and transfer the weight input to the weight register 502 based on the control signal. The weight register 502 can statically store the weight input such that as activation inputs are transferred to the cell, e.g., through the activation register 506, over multiple clock cycles, the weight input remains within the cell and is not transferred to an adjacent cell. Therefore, the weight input can be applied to multiple activation inputs, e.g., using the multiplication circuitry 508, and respective accumulated values can be transferred to an adjacent cell.

Figure 6:
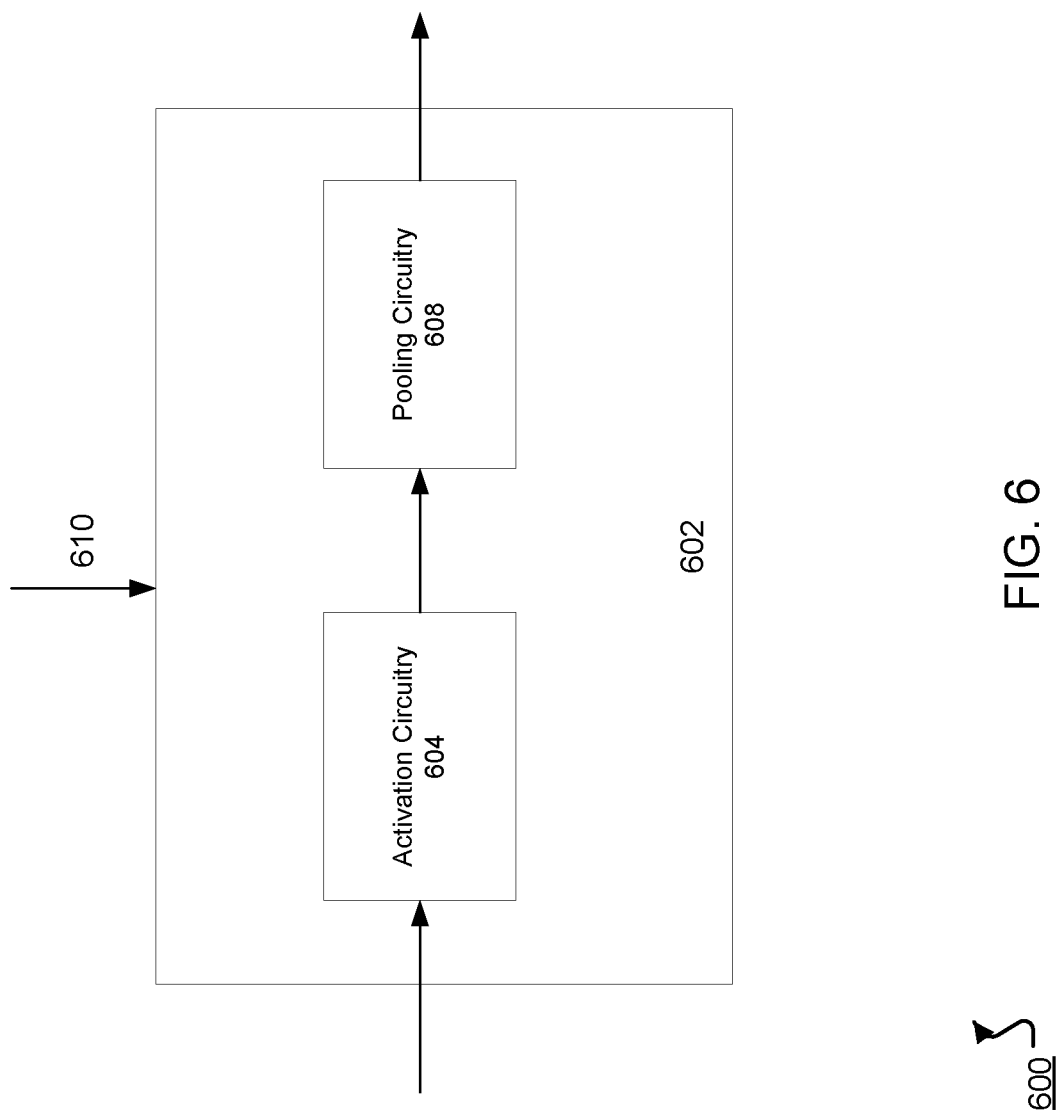
FIG. 6 shows an example architecture of a vector computation unit.

FIG. 6 shows an example architecture 700 of a vector computation unit 602. The vector computation unit 602 can receive a vector of accumulated values from a matrix computation unit, e.g., the matrix computation unit 312 described in reference to FIG. 3 or the accumulators 410 of the matrix computation unit of FIG. 4.

The vector computation unit 602 can process the vector of accumulated values at the activation unit 604. In some implementations, the activation unit includes circuitry that applies a non-linear function to each accumulated value to generate activation values. For example, the non-linear function can be tanh(x), where x is an accumulated value.

Optionally, the vector computation unit 602 can pool values, e.g., activation values, using pooling circuitry 608. The pooling circuitry 608 can apply an aggregation function to one or more of the values to generate pooled values. In some implementations, the aggregation functions are functions that return a maximum, minimum, or average of the values or of a subset of the values.

Control signals 610 can be transferred, e.g., by the sequencer 306 of FIG. 3, and can regulate how the vector computation unit 602 processes the vector of accumulated values. That is, the control signals 610 can regulate whether the activation values are pooled, where the activation values are stored, e.g., in the unified buffer 308, or can otherwise regulate handling of the activation values. The control signals 610 can also specify the activation or pooling functions, as well as other parameters for processing the activation values or pooling values, e.g., a stride value.

The vector computation unit 602 can send values, e.g., activation values or pooled values to a unified buffer, e.g., the unified buffer 308 of FIG. 3. In some implementations, the pooling circuitry 608 receives the activation values or pooled values and stores the activation values or pooled values in the unified buffer.

Figure 7:
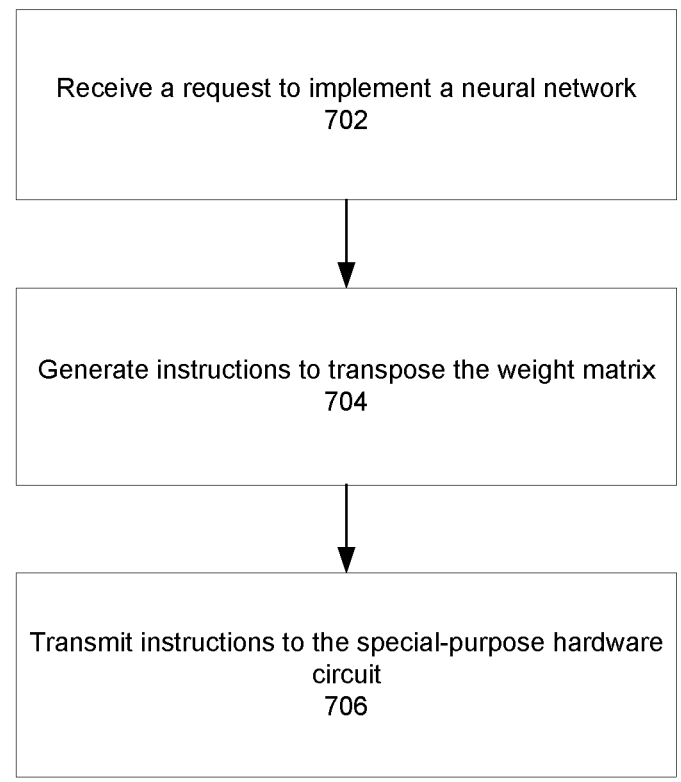
FIG. 7 is a flow diagram of an example process for implementing a neural network that specifies a transpose operation on a matrix.

FIG. 7 is a flow diagram of an example process 700 for implementing a neural network that specifies a transpose operation on a matrix. Generally, the process 700 is performed by a system of one or more computers that includes a special-purpose hardware circuit (e.g., special purpose hardware circuit 110 of FIG. 1).

The system receives a request to implement a neural network on the special-purpose hardware circuit (step 702). In particular, the neural network includes a number of neural network matrices and specifies a transpose operation on a first neural network matrix of the neural network matrices.

The system generates instructions that when executed by the special-purpose hardware circuit cause the special-purpose hardware circuit to transpose the first neural network matrix (step 704). The instructions cause the special-purpose hardware circuit to iteratively transpose the matrix by updating each submatrix of a current subdivision of the matrix during each iteration. Updating each submatrix of the current subdivision includes swapping an upper right quadrant of the current submatrix and a lower left quadrant of the submatrix using a matrix computation unit in the special-purpose hardware circuit. Updating submatrices of a current subdivision during each iteration is described in greater detail below with reference to FIG. 8.

A subdivision of a matrix is a division of the matrix into one or more submatrices. At each iteration, the instructions cause the special-purpose hardware circuit to divide the matrix into one or more (e.g., four) submatrices to generate a current subdivision of the matrix. For instance, at the first iteration, the instructions cause the special-purpose hardware circuit 110 to generate an initial current subdivision that includes only one current submatrix. In other words, the current submatrix of the first iteration includes the entire first neural network matrix as the one and only submatrix. At each subsequent iteration, the instructions cause the special-purpose hardware circuit to generate an updated current subdivision by diving each subdivision in the current subdivision into one or more (e.g., four) subdivisions.

In some implementations, the first neural network matrix is a $2^i*2^i$ matrix, where i is a non-negative integer, and updating the matrix includes, at each iteration, dividing the first neural network matrix to submatrices of size $2^j*2^j$ and swapping each particular submatrix by one corresponding submatrix that is not vertically or horizontally adjacent to the particular submatrix but is diagonally adjacent to the particular submatrix. In some of those implementations, the value of j is (i−1) in the first iteration and is decremented in each iteration.

The iterations continue until a submatrix of the current subdivision is a single value within the first neural network matrix. At that point, because a single value can no longer be subdivided into further submatrices, the iterations terminate.

In some implementations, the system performs matrix multiplication operation as a combination of vector multiplications on vectors with a maximum vector length. The maximum vector length is the maximum length of a vector that can be multiplied by a matrix by the matrix computation unit in one pass, i.e., without dividing the vector into multiple inputs to the matrix computation unit. For example, if the matrix computation unit is a one-dimensional or two-dimensional systolic array, the maximum vector length is equal to the number of columns in the unit or to the number of rows in the unit.

In some of those implementations, the system obtains information indicating that zero values have been added to the neural network matrix to adjust the dimensions of the matrix such that the matrix is divisible into vectors with the maximum vector length. In other words, the neural network matrix has been zero-padded to adapt to the architectural configuration of the system. In response to that information, the system can avoid performing value-by-value multiplication operations that involve values identified as having been added as a result of zero-padding, as such operations always return a value of zero. As a result, the system can reduce the number of value-by-value multiplication operations needed to perform such vector multiplications.

The system transmits the instructions to the special-purpose hardware circuit (step 706).

For example, the neural network implementation engine 150 can provide the instructions to the special-purpose hardware circuit 110, and the special-purpose hardware circuit 110 can receive the instructions, e.g., at the host interface 302 of FIG. 3. The neural network implementation engine 150 may also provide other instructions and/or parameters for the neural network computation that can also be received by the host interface 302.

Figure 8:
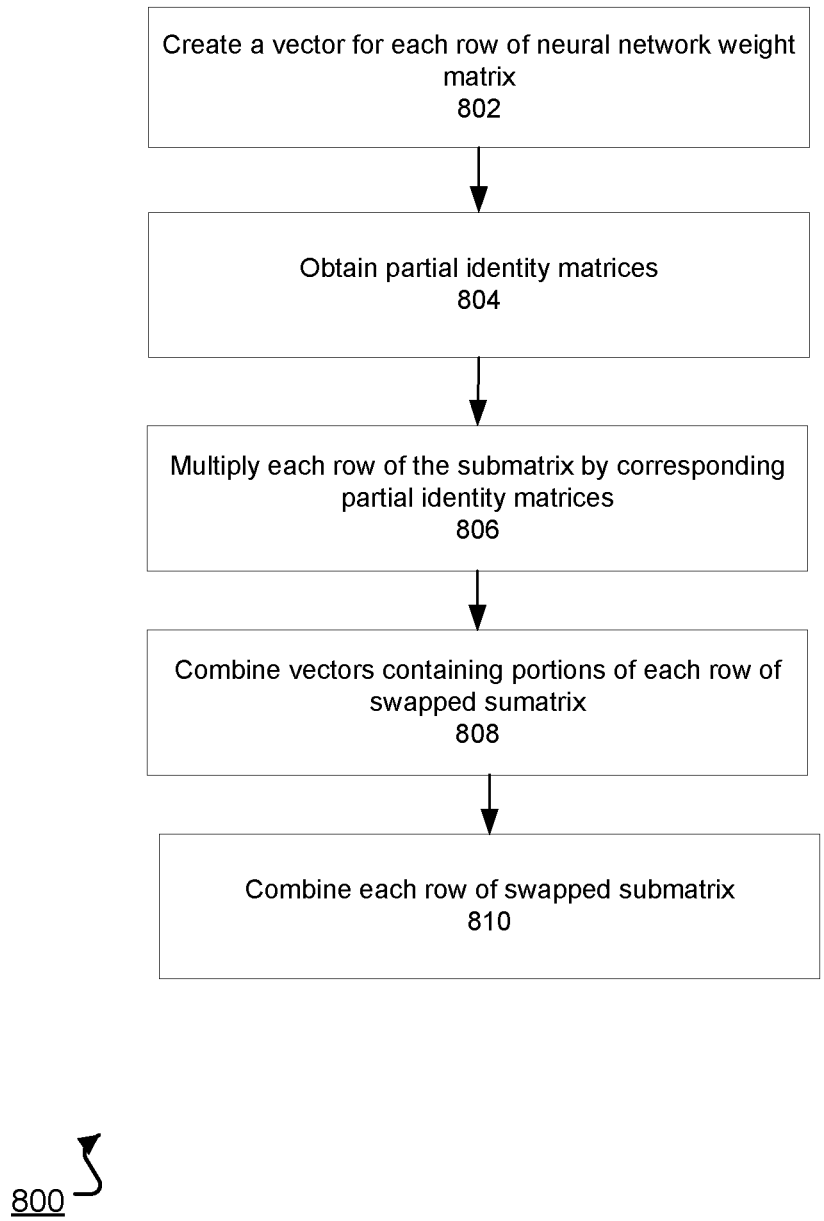
FIG. 8 is a flow diagram of an example process for swapping the upper right and lower left quadrants of a submatrix using a matrix computation unit.

FIG. 8 is a flow diagram of an example process 800 for updating a submatrix of a current subdivision of a neural network matrix using a special-purpose hardware circuit. For example, the process 800 can be performed by the special-purpose hardware circuit 110 of FIG. 1 based on instructions received from the neural network implementation engine 150. The special-purpose hardware circuit updates a submatrix of a current subdivision by swapping an upper right quadrant of the submatrix and a lower left quadrant of the submatrix using a matrix computation unit in the special-purpose hardware circuit 110.

The special-purpose hardware circuit 110 creates a vector for each row of the neural network matrix (802).

The special-purpose hardware circuit 110 obtains, for each value of the swapped submatrix that the circuit 110 seeks to generate, a partial identity matrix (804). The circuit 110 may use the same partial identity matrix to generate two or more values of the swapped submatrix.

A partial identity matrix is a matrix that includes only "0" and "1" values. The "1" values in a partial identity matrix are strategically located so that, when multiplied by a vector that includes the values in a row of the first neural network matrix, the output of the multiplication preserves certain values of the vector while nullifying (i.e., outputting "0") for other values.

In some implementations, if the vector containing values for a row of the neural network matrix is of a dimension d, a partial identity matrix that, when multiplied by the vector, returns the i and (i+1) values of the vector in the j and (j+1) values of a resultant vector respectively is a d*d matrix that has a 1 value in the [i,j] and [i+1 and j+1] positions and zeros elsewhere.

The special-purpose hardware circuit 110 multiplies each row of the neural network matrix by one or more partial identity matrices to obtain the values from the row needed to update the neural network matrix to swap the upper right and lower left quadrants of each submatrix in the current subdivision (806).

For instance, the vector $V_1$=[A B] can include two values of the first row of a neural network matrix. In order to extract the first value of the vector, the special-purpose hardware circuit multiplies $V_1$ by the following partial identity matrix $I_1$:

$$\begin{matrix} 1 & 0 \\ 0 & 0 \end{matrix}$$

The output of $V_1*I_1$=[A 0]. Therefore, the value of A is preserved while the value of B is nullified.

The special-purpose hardware circuit 110 combines the vectors containing portions of each row of the updated neural network matrix to generate that row (908). For instance, $V_1$ may be the first row of a neural network matrix $M_1$:

$$A\ B$$
$$C\ D$$

The first row of the updated matrix $S_1$ corresponding to the matrix $M_1$ will include the first element of $V_1$ and the first element of the vector $V_2=[C\ D]$, which includes the values of the second row of the matrix $M_1$.

In other words, the two vectors containing portions of the first row of the updated matrix $S_1$ are the output of $V_1*I_1$ and the output of $V_2*I_1$. The special purpose hardware circuit 110 can combine those two vectors to generate the first row of the swapped submatrix $S_1$.

The special-purpose hardware circuit 110 combines each row of the neural network matrix to generate the updated neural network matrix (810).

Because swapping the upper right and lower left quadrants of each submatrix can be performed using the matrix multiplication unit (e.g., using a series of matrix-vector multiplications and additions, as further described below), the special purpose hardware circuit 110 can perform a transpose operation on a matrix without possessing the capabilities for a direct matrix transpose operation. As such, the neural network implementation engine 150 can process an incompatible layer specifying the transpose of a matrix using the hardware circuit 110.

FIG. 9 is an example of a computation for performing a transpose operation on a neural network matrix. The example of FIG. 9 may be performed using the process of FIG. 7 and the special-purpose hardware circuit 300 of FIG. 2.

In part (a) of FIG. 9, the special-purpose hardware circuit forms a current subdivision of a 4×4 matrix by creating a submatrix that includes the entire matrix. The circuit creates a vector including the values of each row of the neural network matrix. For instance, the circuit creates a vector Input[0] including the values of the first row of the matrix.

Part (b) of FIG. 9 depicts four partial identity matrices. Each partial identity matrix has a structure that is defined by the location of "1" values within the matrix. The structure of each partial identity matrix is strategically designed to extract certain values from vectors shown in part (a) while nullifying other values in those vectors. For instance, the special-purpose hardware circuit uses the partial identity matrix W1 to extract the first and second values of a vector.

In part (c) of FIG. 9, the special-purpose hardware circuit performs four sets of computations using the vectors depicted in part (a) and partial identity matrices depicted in part (b). The circuit uses each sets of computations to generate a row of an updated neural network matrix that includes the element of the neural network matrix depicted in part (a) but with the upper right and lower left quadrants of each submatrix swapped. For instance, the circuit uses the first set of computations to generate [A B I J], which is the first row of the neural network submatrix with the upper right and lower left quadrants of each submatrix swapped.

Part (d) of FIG. 9 depicts the output of updating the neural network matrix depicted in part (a) by swapping upper right and lower left quadrants of each submatrix in the neural network matrix.

In part (e), the special-purpose hardware circuit divides the updated neural network matrix depicted in part (d) into rows.

Part (f) of FIG. 9 depicts four partial identity matrices. The structure of each partial identity matrix depicted in part (f) is strategically designed to extract certain values from vectors shown in part (d) while nullifying other values in those vectors.

In part (g), the special-purpose hardware circuit performs four sets of computations using the vectors depicted in part (e) and partial identity matrices depicted in part (f). When performed on the neural network matrix depicted in part (e), the computations lead to an update to the neural network matrix depicted in part (e) to swap the upper right and lower left quadrants of each submatrix in a new subdivision of the neural network matrix into four submatrices. The updated matrix shown in part (h) is a transpose of the matrix shown in part (a).

Operations performed in parts (d)-(g) of FIG. 9 are a repetition of operations performed in parts (a)-(c) of FIG. 9. After part (g), though, new submatrices formed out of the submatrices depicted in part (e) are single values that can no longer be further subdivided into quadrants. Therefore, the operations will not be repeated anymore.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for transposing a neural network matrix on a special-purpose hardware circuit having a matrix computation unit, wherein the special-purpose hardware circuit is configured to perform neural network computations in hardware using the matrix computation unit, wherein the matrix computation unit is a two-dimensional systolic array configured to perform multiplication of a first input matrix and a second input matrix, the method comprising:

receiving, from a neural network implementation engine, a request to perform computations for a neural network on the special-purpose hardware circuit, the request specifying a transpose operation to be performed on the neural network matrix;

subsequent to receiving the request, dividing an intermediate neural network matrix into a plurality of submatrices in a current subdivision;

creating a plurality of vectors, each of the plurality of vectors corresponding to each row of the intermediate neural network matrix and including values of each row of the intermediate neural network matrix;

obtaining, for the plurality of vectors, a plurality of partial identity matrices that are used to extract a portion of values from each of the plurality of vectors while nullifying a remaining portion of values;

multiplying, by performing one or more matrix multiplications using the special-purpose hardware circuit, each of the plurality of vectors by one or more of the plurality of partial identity matrices, to generate a row of an updated neural network matrix, wherein the updated neural network matrix includes elements of the neural network matrix but with swapped upper right and lower left quadrants of the plurality of submatrices in the current subdivision;

updating the intermediate neural network matrix by combining the generated rows; and generating the intermediate neural network matrix as a transposed neural network matrix.

2. The method of claim 1, further comprising:

determining that the neural network matrix is not a i×i matrix, where i is a vector length value for the hardware circuit;

in response determining, updating the neural network matrix to generate a i×i matrix by zero-padding the neural network matrix; and converting the transposed neural network matrix to its condition before the transposing by removing the zeros padded during the transpose.

3. The method of claim 2, further comprising:

obtaining data indicating that one or more values of the neural network matrix are zero values; and preventing the hardware circuit from performing any operation on a set of values including at least one of the one or more values of the neural network matrix that are zero values.

4. The method of claim 1, wherein the hardware circuit performs matrix multiplication operations as a series of vector multiplication operations based in part on a maximum vector length of at least one of the plurality of vectors.

5. A system comprising a non-transitory machine-readable storage device storing instructions for transposing a neural network matrix using a special-purpose hardware circuit having a matrix computation unit, wherein the special-purpose hardware circuit is configured to perform neural network computations in hardware using the matrix computation unit, wherein the matrix computation unit is a two-dimensional systolic array configured to perform multiplication of a first input matrix and a second input matrix, the instructions being executable by a processing device to cause performance of operations comprising:

receiving, from a neural network implementation engine, a request to perform computations for a neural network on the special-purpose hardware circuit, the request specifying a transpose operation to be performed on the neural network matrix;

subsequent to receiving the request, dividing an intermediate neural network matrix into a plurality of submatrices in a current subdivision;

creating a plurality of vectors, each of the plurality of vectors corresponding to each row of the intermediate neural network matrix and including values of each row of the intermediate neural network matrix;

obtaining, for the plurality of vectors, a plurality of partial identity matrices that are used to extract a portion of values from each of the plurality of vectors while nullifying a remaining portion of values;

multiplying, by performing one or more matrix multiplications using the special-purpose hardware circuit, each of the plurality of vectors by one or more of the plurality of partial identity matrices, to generate a row of an updated neural network matrix, wherein the updated neural network matrix includes elements of the neural network matrix but with swapped upper right and lower left quadrants of the plurality of submatrices in the current subdivision;

updating the intermediate neural network matrix by combining the generated rows; and generating the intermediate neural network matrix as a transposed neural network matrix.

6. The system of claim 5, wherein the operations further comprise:

determining that the neural network matrix is not a i×i matrix, where i is a vector length value for the hardware circuit;

in response determining, updating the neural network matrix to generate a i×i matrix by zero-padding the neural network matrix; and converting the transposed neural network matrix to its condition before the transposing by removing the zeros padded during the transpose.

7. The system of claim 6, wherein the operations further comprise:

obtaining data indicating that one or more values of the neural network matrix are zero values; and preventing the hardware circuit from performing any operation on a set of values including at least one of the one or more values of the neural network matrix that are zero values.

8. The system of claim 5, wherein the operations further comprise:

performing matrix multiplication operations as a series of vector multiplication operations based in part on a maximum vector length of at least one of the plurality of vectors.

9. A non-transitory computer-readable storage medium encoded with instructions for transposing a neural network matrix using a special-purpose hardware circuit having a matrix computation unit, the instructions being executable by a processing device to cause performance of operations comprising:

receiving, from a neural network implementation engine, a request to perform computations for a neural network on the special-purpose hardware circuit, the request specifying a transpose operation to be performed on the neural network matrix, wherein the special-purpose hardware circuit is configured to perform neural network computations in hardware using the matrix computation unit, wherein the matrix computation unit is a two-dimensional systolic array configured to perform multiplication of a first input matrix and a second input matrix;

subsequent to receiving the request, dividing an intermediate neural network matrix into a plurality of submatrices in a current subdivision;

creating a plurality of vectors, each of the plurality of vectors corresponding to each row of the intermediate neural network matrix and including values of each row of the intermediate neural network matrix;

obtaining, for the plurality of vectors, a plurality of partial identity matrices that are used to extract a portion of values from each of the plurality of vectors while nullifying a remaining portion of values;

multiplying, by performing one or more matrix multiplications using the special-purpose hardware circuit, each of the plurality of vectors by one or more of the plurality of partial identity matrices, to generate a row of an updated neural network matrix, wherein the updated neural network matrix includes elements of the neural network matrix but with swapped upper right and lower left quadrants of the plurality of submatrices in the current subdivision;

updating the intermediate neural network matrix by combining the generated rows; and generating the intermediate neural network matrix as a transposed neural network matrix.

10. The non-transitory computer storage medium of claim 9, wherein the operations further comprise:

receiving a request to perform computations for the neural network on the hardware circuit, the request specifying a transpose operation to be performed on the neural network matrix.

11. The non-transitory computer storage medium of claim 10, wherein the operations further comprise:

determining that the neural network matrix is not a i×i matrix, where i is a vector length value for the hardware circuit;

in response determining, updating the neural network matrix to generate a i×i matrix by zero-padding the neural network matrix; and converting the transposed neural network matrix to its condition before the transposing by removing the zeros padded during the transpose.

12. The non-transitory computer storage medium of claim 11, wherein the operations further comprise:

obtaining data indicating that one or more values of the neural network matrix are zero values; and preventing the hardware circuit from performing any operation on a set of values including at least one of the one or more values of the neural network matrix that are zero values.

13. The non-transitory computer storage medium of claim 9, wherein the operations further comprise:

performing matrix multiplication operations as a series of vector multiplication operations based in part on a maximum vector length of at least one of the plurality of vectors.

* * * * *